ically to that type commonly known as
UNITED STATES PATENT OFFICE.

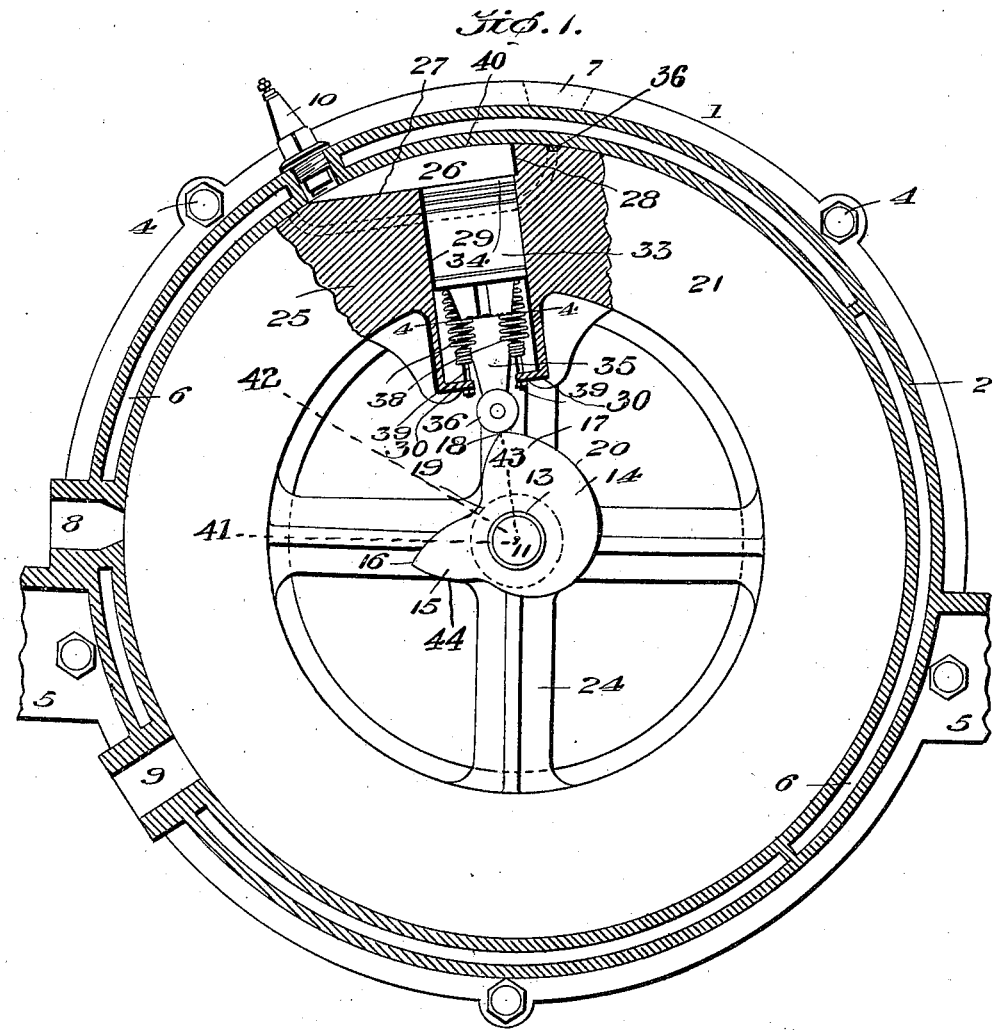
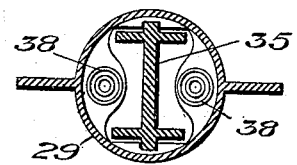

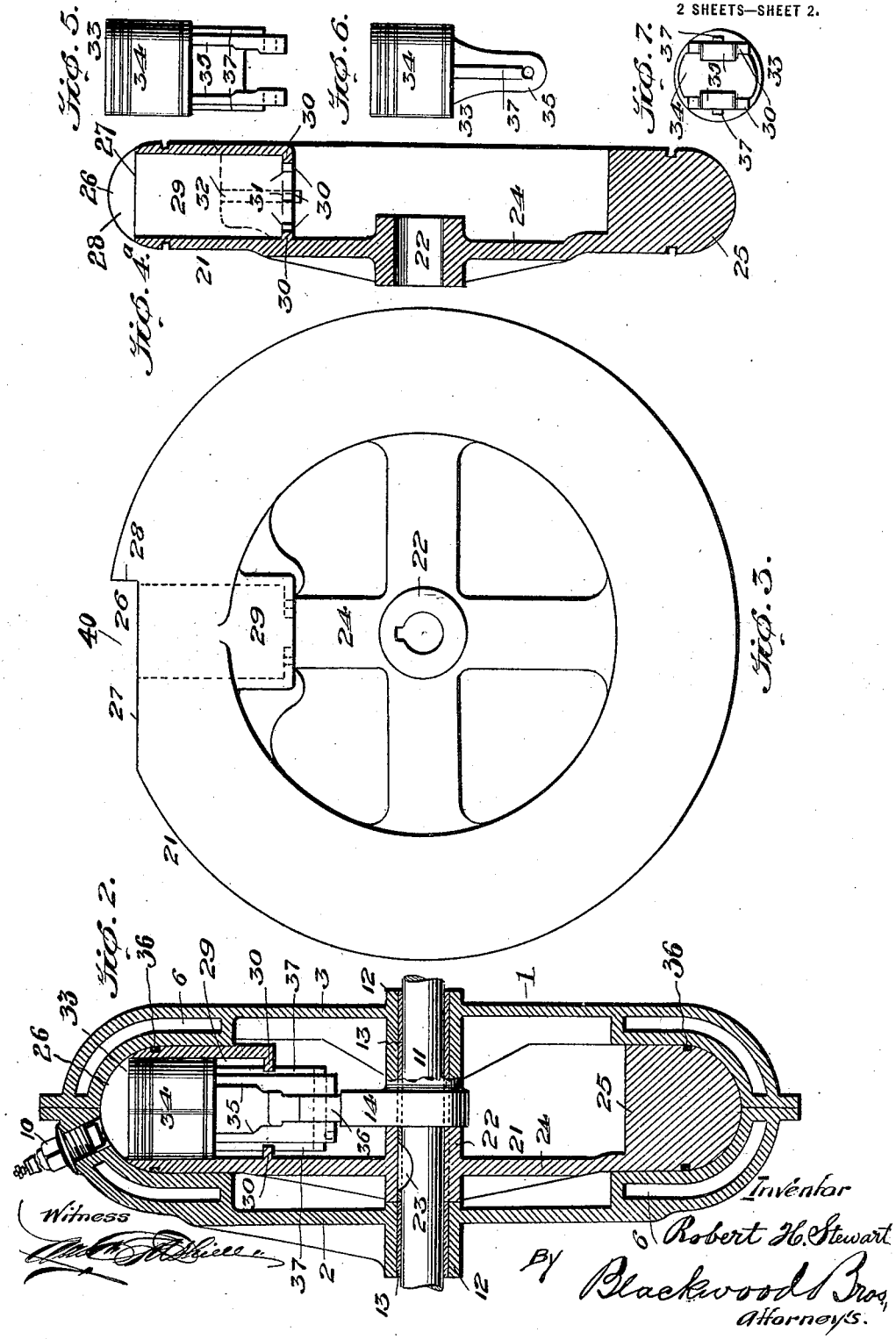

ROBERT H. STEWART, OF GREENSBORO, NORTH CAROLINA, ASSIGNOR TO R. H. S. MOTORS, INCORPORATED, A CORPORATION OF NORTH CAROLINA.

ROTARY GAS ENGINE OR MOTOR.

1,394,587. Specification of Letters Patent. Patented Oct. 25, 1921.

Application filed July 31, 1920. Serial No. 400,393.

*To all whom it may concern:*

Be it known that I, ROBERT H. STEWART, residing at Greensboro, in the county of Guilford and State of North Carolina, a citizen of the United States, have invented certain new and useful Improvements in Rotary Gas Engines or Motors; and I do hereby declare the following to be a full, clear, and exact description of the invention, such as will enable others skilled in the art to which it pertains to make and use the same.

My invention relates to improvements in rotary gas engines or motors, and more particularly to that type commonly known as internal combustion explosive gas engines.

The object of the invention is to provide an engine with internal component parts which are so constructed and arranged that they perform the functions of suction, compression, explosion and exhaust entirely within the casing inclosing the engine.

A further object is to provide an engine which will furnish the same or similar amount of explosive power direct from the shaft instead of from a crank or other part.

A further object is to provide an engine in which crank shafts, cam shafts, connecting rods and piston pins are eliminated and in which there are no valves to be ground, no gaskets to blow out and no timing gears to wear out.

A further object is to provide an engine in which the inclosing casing is entirely surrounded by chambers containing water or other suitable cooling medium by means of which all the several parts of the engine are maintained in a cool state.

A still further object is to provide an engine which is simple, inexpensive, compact and durable in construction, easy and efficient in operation, easy to repair, attractive in appearance or design, and in which the loss incident to undue friction is eliminated and a maximum amount of operating power is obtained from a minimum amount of fuel, thereby effecting the economizing and saving of gasolene, oil and having a minimum number of parts the weight is also reduced.

The invention consists in the several features and in the construction, combination and arrangement of such features as more fully hereinafter described and claimed.

In the drawings:

Figure 1 is a vertical longitudinal section of the casing of the engine with some of the operative parts shown in elevation.

Fig. 2 is a central vertical cross section.

Fig. 3 is a side view in elevation of the rotor.

Fig. 4 is a section taken on the line 4—4 of Fig. 1.

Fig. 4ª is a sectional view of the rotor.

Fig. 5 is a front view of the piston.

Fig. 6 is a side view of the piston, and

Fig. 7 is a bottom plan view of the piston.

In the drawings, in which like reference characters denote like parts throughout the several views, 1 represents the inclosing casing of the engine or motor preferably constructed or made in two parts 2 and 3 secured or fastened together by means of a plurality of screw bolts 4, and 5 are suitable extensions or flanges whereby the casing is adapted to be secured upon any suitable frame or other support.

The casing 1 is provided with surrounding chambers 6, each having an inlet 7 for water or other suitable cooling medium by which the casing and operating parts of the engine are maintained or kept in a cool state, and with a gas inlet 8, gas exhaust 9, and a spark plug 10, of well known construction, having the usual firing and controlling means.

A driving shaft 11 is mounted in suitable bearings 12 of the casing, and 13 are packing rings inserted between the bearings of the casing and the shaft 11 to provide and maintain a tight joint, but at same time allow the shaft to revolve or rotate freely therein.

An operating cam or eccentric 14 is formed integral with the bearing 12 of the part 3 of the casing and projects vertically therefrom at approximately the center of the casing, the driving shaft 11 passing loosely therethrough, and is provided with a lug 15 having a peak or apex 16, a lug 17 having a peak or apex 18 less in height than the peak or apex 16, a hollow inwardly curved portion 19 between lugs 15 and 17 and an outwardly rounded cam portion 20 which curves from the peak or apex of the lug 17 to the base of the lug 15.

Rotatably mounted within the inclosing casing 1 of the engine or motor is a rotor or fly wheel 21 which comprises an integral hub 22 rigidly mounted on the drive shaft 11 by means of a key or wedge 23, a cylindrical vertical portion 24 having an annular solid rim 25 which is provided with a peripheral cut-away portion or recess 26 having a bottom surface 27 and a vertical wall 28 at one end thereof.

Below the recess 26 the rotor is provided with a single integral vertical piston cylinder 29, the upper end of which is entirely open, while the lower end is provided with inwardly and laterally extending lugs 30 having guide ways 31 and vertical strengthening ribs 32.

The vertical piston cylinder 29 is provided with a piston 33 having a head 34, and a stem 35 provided with a roller 36 which bears continually and travels on the surface of the cam 14 by means of which the piston is caused to reciprocate in the piston cylinder 29. The piston is also provided with guide ribs 37 adapted to fit and slide in the guide ways 31 for the purpose of maintaining the piston in its proper alinement, and 38 are spiral springs attached to the lugs 30 by bolts 39 and also attached to the under portion of the piston head 34 by any suitable fastening device. The rotor, its hub and rim and the piston cylinder are preferably formed integral, but if found desirable may be made in separate pieces and bolted or otherwise secured together.

The spiral springs 38 serve to keep the roller 36 in intimate contact with the surface of the cam at all times and also to return the piston to its normal position.

The recess 26 in combination with the inner curved portion of the casing 1 forms a gas-receiving chamber or pocket 40, and gas being introduced thereto and compressed therein by the piston is fired or exploded by the spark plug 10.

The several parts of the engine or motor are provided with suitable packings 36 in order to keep them air and gas-tight.

The speed of the engine or motor will be at least 2,500 R. P. M., although it will only fire once on each revolution of the motor.

In operation gas is introduced or furnished to the engine of motor from any source of supply through the gas inlet into the piston cylinder which must register with the gas inlet on the starting of the engine, and from the time the roller leaves the point 41 of the cam until it reaches the point 42 the piston will constantly draw in the gas from the gas inlet into the piston cylinder and from the point 42 to the point 43 the piston will compress the gas which has been drawn into the piston cylinder, and when the point 43 has been reached all the gas which has been drawn into the cylinder 29 will be expelled therefrom into the chamber 40 and exploded by the spark plug and the force of the explosion acting on the rotor will cause it to be rotated or moved to the right, which in turn will cause the roller on the piston to move downward and around the curved portion 20 of the cam until it reaches the point 44, when the cylinder 29 will be in alinement with the exhaust port 9, and the exploded gas will exhaust through such port, after which the operation will be repeated.

I do not wish to be understood as limiting myself to the specific details of construction and arrangement as herein described and illustrated, as it is manifest that variations and modifications may be made in the features of construction and arrangement in the adaptation of the device to various conditions of use without departing from the spirit and scope of my invention and improvements. I, therefore, reserve the right to all such variations and modifications as properly fall within the purview of my invention and the terms of the following claims.

What I claim is:

1. In a rotary explosive engine or motor, a casing provided with a bearing projecting beyond the vertical inner line of said casing, a cam rigidly mounted on said bearing, a rotor having a piston cylinder with a piston, a drive shaft mounted in said bearing and rigidly connected to said rotor and means for operatively connecting the piston with the cam.

2. In a rotary explosive engine or motor, a drive shaft, a casing provided with a bearing therefor, a cam mounted on the end of said bearing, a rotor having a piston cylinder and a piston and means for operatively connecting the piston with the cam.

3. In a rotary explosive engine or motor, a casing provided with a bearing projecting beyond the vertical inner line of said casing and terminating in a cam, a drive shaft mounted in said bearing, a rotor mounted on said shaft and a piston cylinder and piston on said rotor.

4. In a rotary explosive engine or motor, a casing provided with a bearing projecting beyond the vertical inner line of said casing and terminating in a stationary cam provided with inclined pointed lugs of varying heights, a drive shaft mounted in said bearing, a rotor on said shaft and a piston cylinder and piston.

5. In a rotary explosive engine or motor, a casing provided with a bearing having a stationary cam mounted thereon provided with lugs of varying heights, a drive shaft mounted in said bearing, a rotor mounted on said drive shaft and a piston cylinder and piston.

6. In a rotary explosive engine or motor, a casing provided with an inwardly projecting bearing, a stationary cam mounted on said bearing at a point at substantially the center of said casing, a drive shaft mounted in said bearing, a rotor having a piston cylinder and piston and means for operatively connecting the said piston with the cam.

7. In a rotary explosive engine or motor, a casing provided with an inwardly projecting bearing, a cam integral with said bearing which projects vertically at a point at substantially the center of said casing, a drive shaft mounted in said bearing, a rotor mounted on said drive shaft having a piston cylinder and piston and means for operatively connecting the said piston with the said cam.

8. In a rotary explosive engine or motor, a casing, a rotor within said casing having a piston, a cam on said casing provided with a plurality of pointed lugs of different heights, a depressed portion between said lugs, and an eccentric portion curved from the apex of one lug to the base of the other lug, and means operatively connecting said piston and cam.

In testimony whereof I have affixed my signature.

ROBERT H. STEWART.